US009220980B2

(12) United States Patent
Kim et al.

(10) Patent No.: US 9,220,980 B2
(45) Date of Patent: *Dec. 29, 2015

(54) PAUSE AND RESUME SCHEMES FOR GESTURE-BASED GAME

(71) Applicant: Empire Technology Development LLC, Wilmington, DE (US)

(72) Inventors: Seungil Kim, Seoul (KR); Youngil Ko, Seoul (KR)

(73) Assignee: Empire Technology Development LLC, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 14/175,232

(22) Filed: Feb. 7, 2014

(65) Prior Publication Data

US 2014/0155138 A1 Jun. 5, 2014

Related U.S. Application Data

(63) Continuation of application No. 13/805,464, filed as application No. PCT/KR2011/009790 on Dec. 19, 2011, now Pat. No. 8,684,821.

(51) Int. Cl.
*G06F 17/00* (2006.01)
*A63F 13/40* (2014.01)

(52) U.S. Cl.
CPC ......... *A63F 13/10* (2013.01); *A63F 2300/1093* (2013.01); *A63F 2300/6045* (2013.01); *A63F 2300/636* (2013.01)

(58) Field of Classification Search
CPC ................. A63F 2300/636; A63F 2300/1093; A63F 2300/6045; A01B 12/006

USPC ........... 463/24, 36, 39, 40; 348/114; 382/106, 382/107

See application file for complete search history.

(56) References Cited

U.S. PATENT DOCUMENTS 7,821,541 B2   10/2010 Delean
8,428,368 B2    4/2013 Ivanich et al.
(Continued)

FOREIGN PATENT DOCUMENTS

CN    101132839 A    2/2008
CN    102221877 A   10/2011
(Continued)

OTHER PUBLICATIONS

"WarioWare:Snapped," Wikipedia, accessed at http://en.wikipedia.org/wiki/WarioWare:_Snapped!, accessed on Jan. 10, 2014, pp. 1-1.
(Continued)

*Primary Examiner* — Ronald Laneau
(74) *Attorney, Agent, or Firm* — Brundidge & Stanger, P.C.

(57) ABSTRACT

Technologies are generally described for pausing and resuming a gesture-based game. In some examples, a method performed under control of a gesture-based game system includes receiving a pause command that indicates pausing play of a gesture-based game and in response to the receipt of the pause command, capturing a first image of a player currently playing the gesture-based game, the first image being associated with a first posture of the player substantially at the time of the pause command and generating an outline of the player corresponding to the first image of the player.

20 Claims, 15 Drawing Sheets

(56) References Cited

U.S. PATENT DOCUMENTS

| | | |
|---|---|---|
| 8,457,353 B2 | 6/2013 | Reville et al. |
| 8,719,734 B2 * | 5/2014 | Mun et al. ............ 715/863 |
| 2006/0204012 A1 | 9/2006 | Marks et al. |
| 2006/0252541 A1 | 11/2006 | Zalewski et al. |
| 2006/0256081 A1 | 11/2006 | Zalewski et al. |
| 2007/0213128 A1 | 9/2007 | Ohta |
| 2009/0027337 A1 | 1/2009 | Hildreth |
| 2010/0050134 A1 * | 2/2010 | Clarkson ............ 715/863 |
| 2010/0091110 A1 | 4/2010 | Hildreth |
| 2010/0248832 A1 | 9/2010 | Esaki et al. |
| 2010/0295781 A1 * | 11/2010 | Alameh et al. ............ 345/158 |
| 2010/0302138 A1 | 12/2010 | Poot et al. |
| 2011/0190055 A1 | 8/2011 | Leyvand et al. |
| 2011/0237324 A1 | 9/2011 | Clavin et al. |
| 2012/0165097 A1 | 6/2012 | Leyvand et al. |
| 2013/0005434 A1 | 1/2013 | Takehiro |

FOREIGN PATENT DOCUMENTS

| | | |
|---|---|---|
| JP | 2007236696 A | 9/2007 |
| JP | 2007296367 A | 11/2007 |
| JP | 2013013479 A | 1/2013 |
| WO | 2006121681 A1 | 11/2006 |
| WO | 2007130792 A2 | 11/2007 |

OTHER PUBLICATIONS

Dotson, K., "Kinect and Mass Effect 3: The Power of Your Voice," accessed at http://siliconangle.com/blog/2011/06/06/kinect-and-mass-effect-3-the-power-of-your-voice/, Jun. 6, 2011, pp. 1-4.

Greene, B.N., "Kinect, Netflix, and Voice! Oh, My!," Que, accessed at http://www.quepublishing.com/articles/printerfriendly/1728844, Jun. 30, 2011, pp. 1-3.

International Search Report with Written Opinion for International Application No. PCT/KR2011/009790 Mailed Sep. 28, 2012.

* cited by examiner

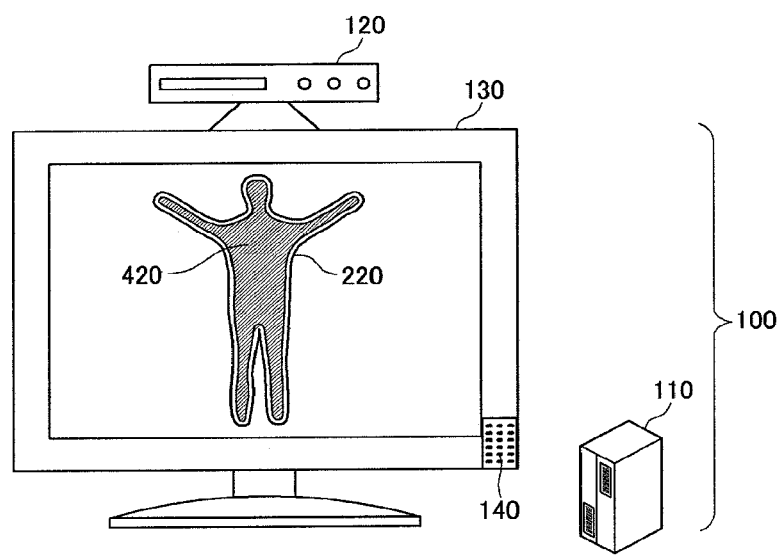
FIG. 4A
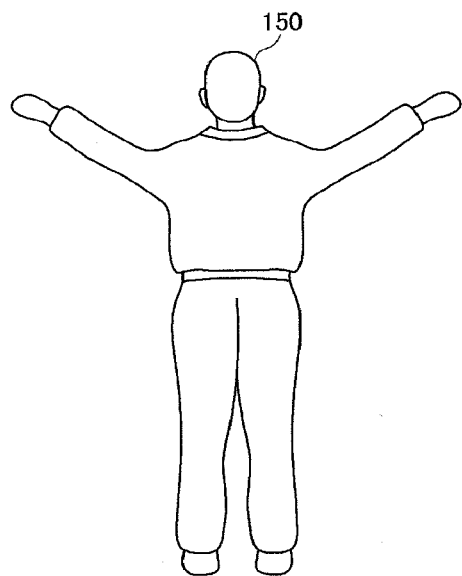

PAUSE AND RESUME SCHEMES FOR GESTURE-BASED GAME

CROSS-REFERENCE TO RELATED APPLICATIONS

This Application is a Continuation Application filing under 35 U.S.C. §120 of U.S. Ser. No. 13/805,464, filed on Dec. 19, 2012, now U.S. Pat. No. 8,684,821, which is a National State filing under 35 U.S.C. §371 of PCT Application Ser. No. PCT/KR2011/009790 filed on Dec. 19, 2011. The disclosures of both applications are hereby incorporated herein by reference in their entireties.

BACKGROUND

Camera technology and gesture recognition technology have experienced phenomenal growth in the last few years. Game devices have adopted such technologies. For example, a game device may utilize a camera to capture and recognize a gesture of a player and use the recognized gesture of the player as an input signal for playing a game. Game software developers have developed various types of gesture-based games for such game devices. There are, however, drawbacks associated with gesture-based games, such as when resuming after a stoppage in play.

SUMMARY

In an example, a method performed under control of a gesture-based game system may include receiving a pause command that indicates pausing play of a gesture-based game, and in response to the receipt of the pause command, capturing a first image of a player currently playing the gesture-based game and generating an outline of the player corresponding to the first image of the player. The first image may be associated with a first posture of the player substantially at the time of the pause command.

In an example, a gesture-based game apparatus may include an input receiving unit configured to receive a pause command that indicates pausing play of a gesture-based game, a camera configured to capture a first image of a player currently playing the gesture-based game in response to the receipt of the pause command, and an outline generating unit configured to generate an outline of the player corresponding to the first image of the player. The first image may be associated with a first posture of the player substantially at the time of the pause command.

In an example, a computer-readable storage medium may have stored thereon computer-executable instructions that, in response to execution, cause a gesture-based game apparatus to perform operations including receiving a pause command that indicates pausing play of a gesture-based game, and in response to the receipt of the pause command, capturing a first image of a player currently playing the gesture-based game, generating an outline of the player corresponding to the first image of the player, and pausing the playing of the gesture-based game. The first image may be associated with a first posture of the player substantially at the time of the pause command.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIGS. 4A to 4D schematically show an illustrative example of an environment where a player comes back to a recognition range of a gesture-based game system and resumes the gesture-based game system;

DETAILED DESCRIPTION

Figure 1:
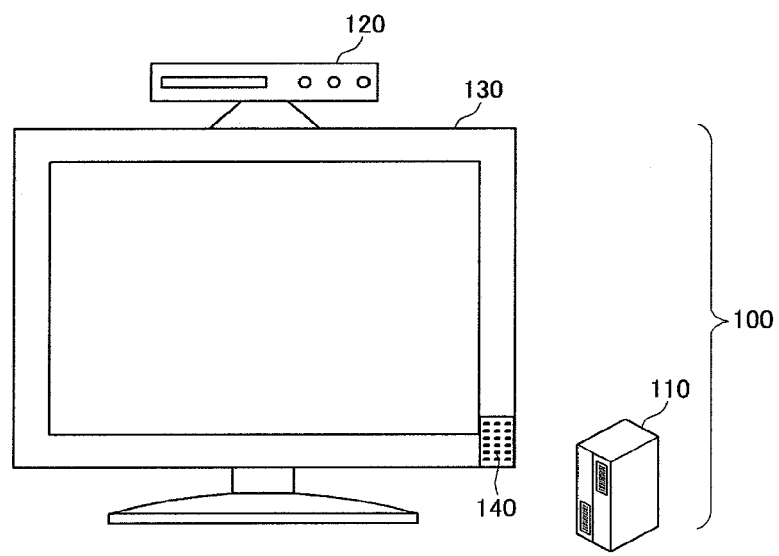
FIG. 1 schematically shows an illustrative example of an environment where a player interacts with a gesture-based game system.
Figure 1:
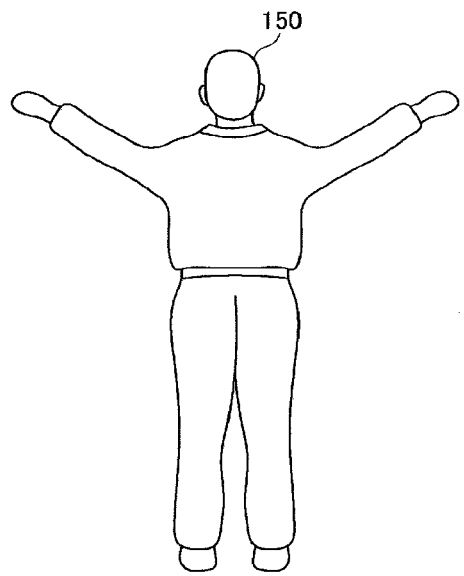

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to pause and resume schemes for gesture-based game systems.

Briefly stated, technologies are generally described for a gesture-based game system configured to pause and resume a gesture-based game in a short time. In some examples, when the gesture-based game system receives a pause command from a player of the gesture-based game system (which may be a voice command or a gesture command), the gesture-based game system may capture a first image of the player and generate an outline corresponding to the captured first image of the player. Then, the gesture-based game may be paused, and the generated outline may be displayed on a screen or display associated with the gesture-based game system. While the gesture-based game is paused, the player can move away from a recognition range of the camera associated with the gesture-based game system. When the player returns to the recognition range of the camera associated with the gesture-based game system, the gesture-based game system may capture a second image of the player. The gesture-based game system may determine whether the captured second image of the player substantially matches the generated outline displayed on the screen or display. If the second image matches the outline, the gesture-based game system may resume the gesture-based game.

FIG. 1 schematically shows an illustrative example of an environment where a player interacts with a gesture-based game system in accordance with at least some embodiments described herein. Although FIG. 1 illustrates one player, it is noted that any number of players can play the gesture-based game together.

As depicted in FIG. 1, a player 150 may play a gesture-based game running on a gesture-based game system 100. The gesture-based game may be played by recognizing bodily gestures of player 150. By way of example, but not limitation, the gesture-based game may include games that involve dancing, boxing, tennis, golf, extreme sports (such as skateboarding, snowboarding, surfing, motocross, etc.) and the like.

In some embodiments, gesture-based game system 100 may include a game console 110, an image capturing unit such as a camera 120, a display 130 and an audio device 140. Game console 110 may facilitate execution of a gesture-based game. Although illustrated as discrete components, various components of gesture-based game system 100 may be divided into additional components, combined into fewer components, or eliminated altogether, depending on the various implementations, and are not limited in this respect. By way of example, but not limitation, camera 120 may be included as a component of game console 110.

Game console 110 may be configured to run or execute the gesture-based game. By way of example, but not limitation, when player 150 inserts a game, such as, but not limited to, a game compact disc (CD) or a game digital versatile disk (DVD) of the gesture-based game into game console 110, game console 110 may execute the gesture-based game. In some embodiments, gesture-based game system 100 may be connected to a cloud game server or a component of a cloud game system, and game console 110 may run or execute the gesture-based game provided by the cloud game server or the cloud game system.

Camera 120 may be configured to capture, detect, and/or recognize players within a predetermined detectable area (e.g., field of view of camera 120) including player 150 of the game running on game console 110. Camera 120 may be one of a set of input devices of gesture-based game system 100. In some embodiments, camera 120 may detect a movement of player 150 and transmit the detected movement, as an electrical signal, to game console 110. By way of example, but not limitation, camera 120 may include, but not limitation, a camera capable of determining depth, facial feature recognition and gesture recognition. Accordingly, camera 120 may include a wide variety of imaging devices which may have the capability of recognizing player 150 and/or recognizing his/her gestures.

Display, or screen, 130 may be configured to display the gesture-based game run or executed by game console 110. In some embodiments, display 130 may display a game character, which makes gestures in the gesture-based game based, at least in part, on gestures that player 150 makes. By way of example, but not limitation, when camera 120 detects a forward movement of player 150, the game character associated with player 150 may also be displayed as moving forward; and if camera 120 detects an upward movement of an arm of player 150, an arm of the game character associated with player 150 may also be displayed as moving upward. Thus, player 150 may move in certain directions or move specific parts of his/her body in certain directions while watching his own game character displayed on display 130 making the same movements. This type of game character interaction may be referred to as an avatar. By way of example, display 130 may include, but not be limited to, a liquid crystal display (LCD), a plasma display panel (PDP), a light emitting diode (LED) backlight display device, or other display device.

Audio device 140 may be one example of output devices of gesture-based game system 100. Audio device 140 may be configured to output background music or sound effects of the gesture-based game. Audio device 140 may be provided as a part of display 130 as shown in FIG. 1 or as a separate device.

Figure 2:
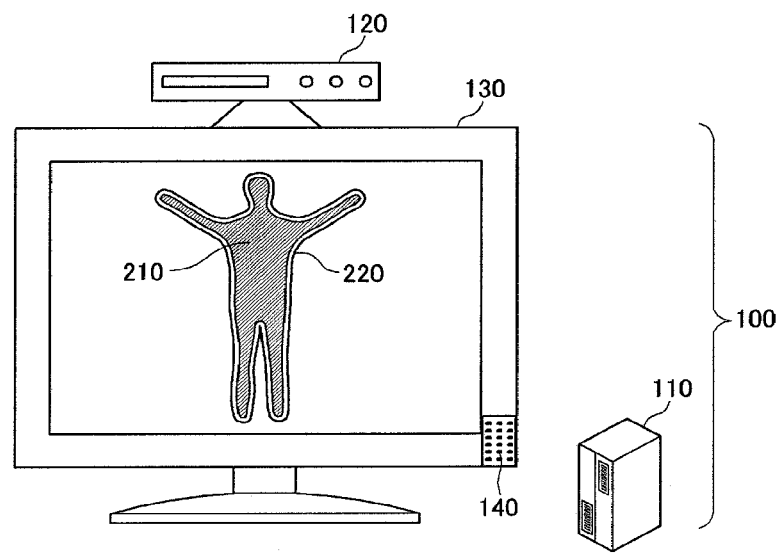
FIG. 2 schematically shows an illustrative example of a gesture-based game system generating an outline of a player of the gesture-based game based, at least in part, on a pause command.
Figure 2:
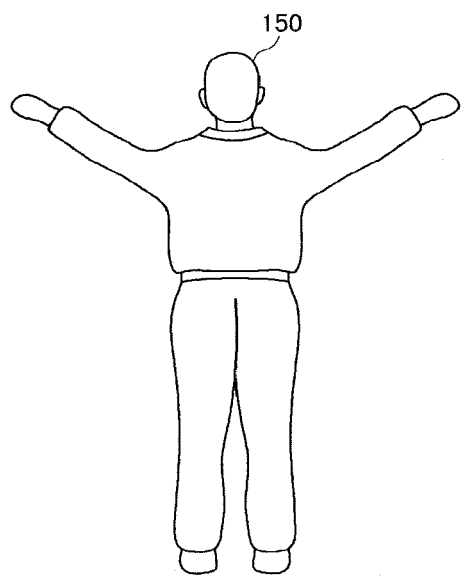

FIG. 2 schematically shows an illustrative example of a gesture-based game system generating an outline of a player of the gesture-based game based, at least in part, on a pause command in accordance with at least some embodiments described herein.

Gesture-based game system 100 may receive a pause command to pause playing of the gesture-based game. In some embodiments, the pause command may include a predetermined gesture that is preset by gesture-based game system 100. By way of example, but not limitation, player 150 may make the predetermined gesture for a certain period of time (e.g., for about 2 seconds). Then, gesture-based game system 100 may detect through camera 120 the gesture of player 150 for the certain period of time and determine it to be the pause command. In other embodiments, the pause command may include a predetermined word that is preset by gesture-based game system 100. By way of example, but not limitation, the predetermined word may be "hold," and player 150 may say "hold" when he/she wants to pause the playing of the gesture-based game. Then, gesture-based game system 100 may detect the speech of "hold" through a microphone (not shown) and determine it to be the pause command. In order to analyze and recognize the speech of player 150, gesture-based game system 100 may include a speech recognition module, which may be installed in game console 110.

In response to the receipt of the pause command, gesture-based game system 100 may capture an image of player 150 currently playing the gesture-based game. As depicted in FIG. 2, camera 120 may capture a first image 210 of player 150. First image 210 may include player 150 assuming a predetermined first posture (e.g., standing with raising both arms as depicted in FIG. 2) and the first posture of player 150 may be taken substantially at the time of the pause command (e.g., in about several milliseconds after the receipt of the pause command). Camera 120 may transmit captured first image 210, as an electrical signal, to game console 110, and display 130 may display captured first image 210.

Gesture-based game system 100 may generate an outline corresponding to the captured image of player 150 assuming the first posture. By way of example, but not limitation, game console 110 may generate an outline 220 of player 150 corresponding to first image 210 of player 150 assuming the first posture. Gesture-based game system 100 may generate outline 220 based, at least in part, on an edge detection process. Further, generated outline 220 may include a skeleton image corresponding to first image 210 of player 150. Generated outline 220 may be displayed on display 130 as shown in FIG. 2.

When generating outline 220 of player 150, gesture-based game system 100 may calculate x-y coordinates of outline 220 of player 150 and store the calculated x-y coordinates. Further, gesture-based game system 100 may calculate a distance between player 150 and camera 120, which may be physically integrated with game console 110, and store the calculated distance.

In some embodiments, gesture-based game system 100 may identify an avatar image associated with first image 210 of player 150 and generate an outline of the avatar image. In such cases, display 130 may display the outline of the avatar image (not shown) which corresponds to first image 210 of player 150.

When outline 220 of player 150 is generated (or in response to the receipt of the pause command), gesture-based game system 100 may pause the playing of the gesture-based game.

Figure 3:
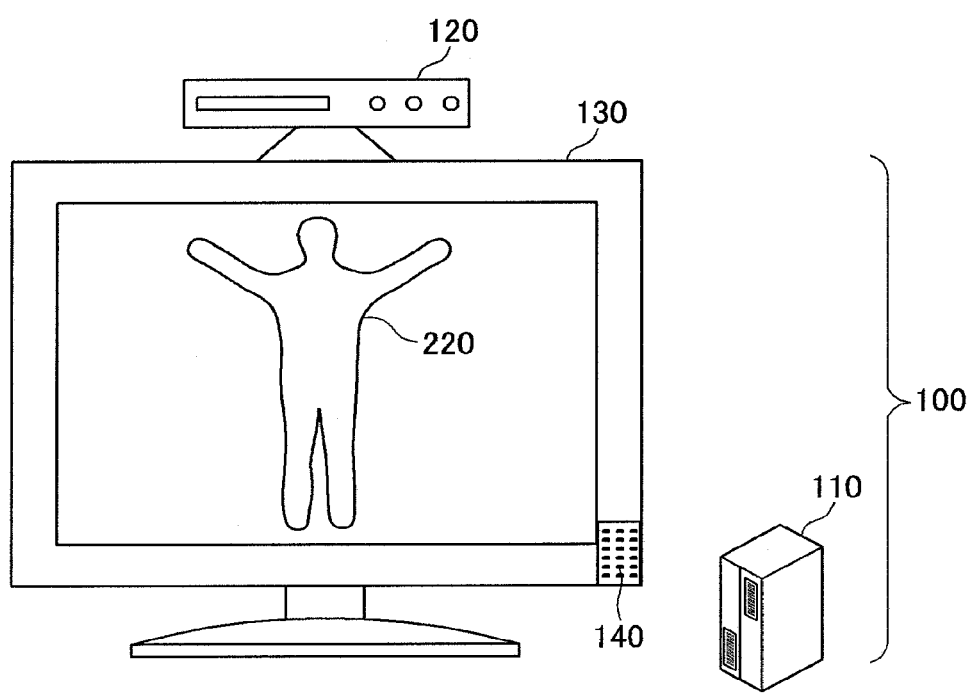
FIG. 3 schematically shows an illustrative example of an environment where a gesture-based game is paused and a player is not within a recognition range of a gesture-based game system.

FIG. 3 schematically shows an illustrative example of an environment where a gesture-based game is paused and a player is not within a recognition range of a gesture-based game system in accordance with at least some embodiments described herein.

As explained above with reference to FIG. 2, when gesture-based game system 100 receives a pause command, the gesture-based game may be paused. While the gesture-based game is paused, player 150 may move away from gesture-based game system 100, particularly away from the gesture-recognition range of camera 120. In some embodiments, while gesture-based game system 100 pauses the gesture-based game, outline 220 of player 150 may still be displayed on display 130 and camera 120 may still be in operation.

FIGS. 4A to 4D schematically show an illustrative example of an environment where a player comes back to a recognition range of a gesture-based game system and resumes the gesture-based game in accordance with at least some embodiments described herein.

When player 150 returns to the gesture-recognition range (e.g., field of view of camera 120) of gesture-based game system 100, gesture-based game system 100 may capture a second image of player 150. The second image of player 150 may be a second posture of player 150 (e.g., standing with raising both arms as depicted in FIG. 4A or standing with raising one arm and lowering the other arm as depicted in FIG. 4B) and the second posture of player 150 may be taken at any time after the gesture-based game is paused.

Gesture-based game system 100 may determine whether the second image of player 150 substantially matches outline 220 of player 150. By way of example, but not limitation, game console 110 may determine whether the second image of player 150 substantially matches outline 220 of player 150. By way of example, but not limitation, game console 110 may determine whether the second image matches outline 220 by calculating a ratio of an area of the portion enclosed in outline 220 of the second image to an area of outline 220, and determining whether the calculated ratio is over a certain threshold value.

Gesture-based game system 100 may compare x-y coordinates of the second image with the x-y coordinates of outline 220 which were obtained when outline 220 is generated. Specifically, gesture-based game system 100 may calculate the x-y coordinates of the second image, and compare the calculated x-y coordinates of the second image with the x-y coordinates of outline 220. Then, gesture-based game system 100 may determine how much the second image matches outline 220 based on the comparison. By way of examples, but not limitation, gesture-based game system 100 may calculate a ratio of an area of the portion of the second image which is enclosed in outline 220 to an area of outline 220. In some embodiments, if the second image 420 matches outline 220 over a certain threshold value, gesture-based game system 100 may determine that second image 420 of player 150 substantially matches outline 220 of player 150. By way of examples, but not limitation, if the ratio of an area of second image 420 which is enclosed in outline 220 to the area of outline 220 is over, e.g., 80%, gesture-based game system 100 may determine that second image 420 of player 150 substantially matches outline 220 of player 150.

Figure 4B:
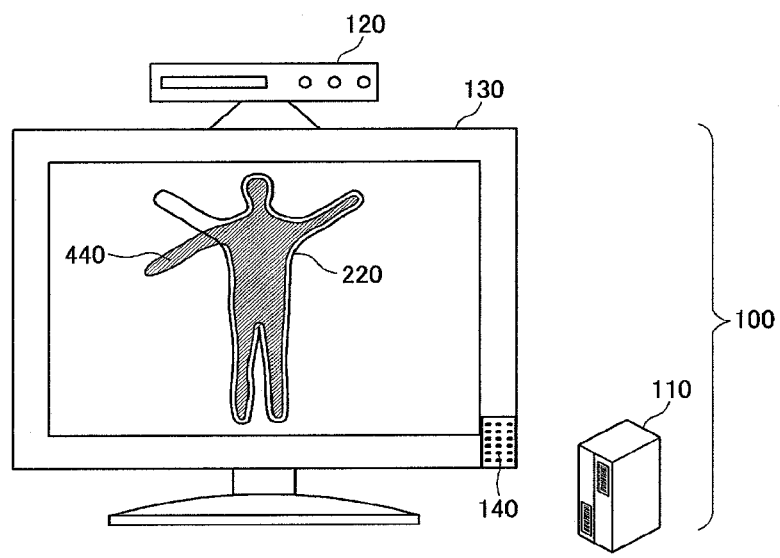
Figure 4B:
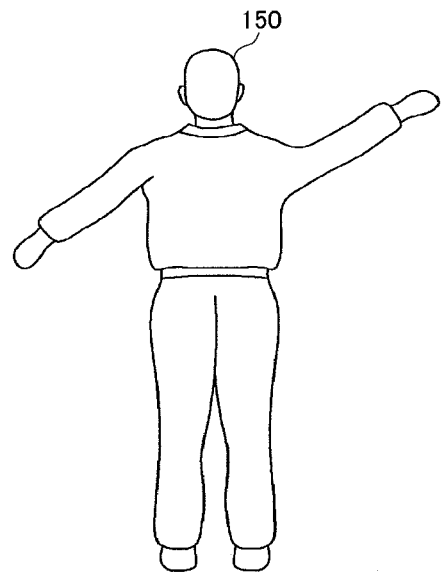

In some embodiments, if second image 420 of player 150 substantially matches outline 220 of player 150 as depicted in FIG. 4A, gesture-based game system 100 may resume the playing of the gesture-based game. On the contrary, if a second image 440 of player 150 does not substantially match outline 220 of player 150 as depicted in FIG. 4B, gesture-based game system 100 may not resume the playing of the gesture-based game.

As described above, when player 150 returns to the field of view of camera 120, gesture-based game system 100 may capture second image 420 and determine whether second image 420 matches outline 220. Even if gesture-based game system 100 does not receive a resume command such as a voice command, when second image 420 at least substantially matches outline 220, gesture-based game system 100 may resume the playing of the gesture-based game. Alternatively, in response to a resume command, gesture-based game system 100 may capture second image 420, determine whether second image 420 at least substantially matches outline 220, and if second image 420 substantially matches outline 220, resume the playing of the gesture-based game.

Further, when gesture-based game system 100 determines whether second image 420 matches outline 220, gesture-based game system 100 may compare a distance between player 150 and camera 120 at the time of capturing the first image of player 150 and a distance between player 150 and camera 120 at the time of capturing the second image of player 150.

As described above, when generating outline 220, gesture-based game system 100 may calculate and store a first distance between player 150 and camera 120. Further, when capturing the second image, gesture-based game system 100 may calculate a second distance between player 150 and camera 120. When determining whether the second image matches outline 220, gesture-based game system 100 may compare the first distance with the second distance.

Figure 4C:
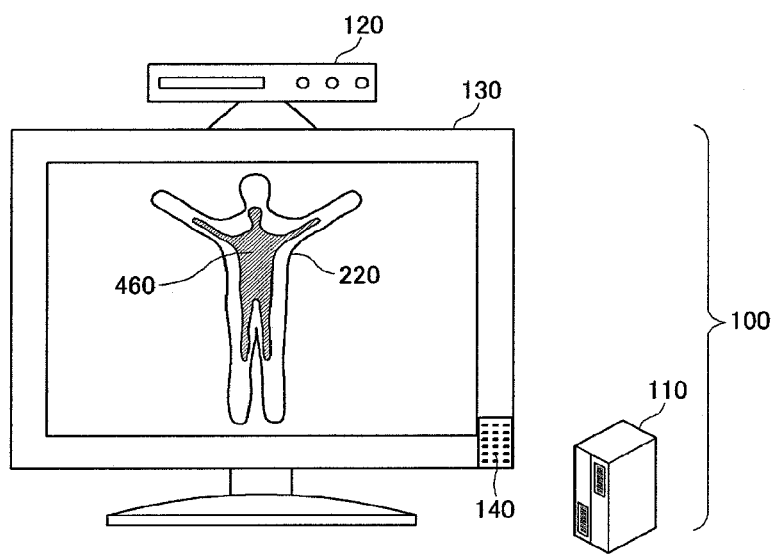
Figure 4C:
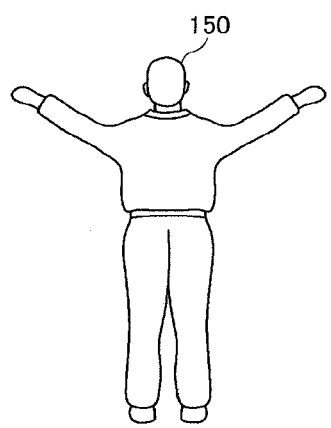

As depicted in FIG. 4C, if a distance between player 150 and camera 120 at the time of capturing a second image 460 is greater than a predetermined distance such as, for example, the distance between player 150 and camera 120 at the time of the pause command, second image 460 may be located inside of or enclosed in outline 220 but an area of second image 460 is substantially smaller than an area of outline 220. By way of example, but not limitation, in cases where a ratio of the area of second image 460 to the area of outline 220 is below a certain threshold, e.g., 80%, gesture-based game system 100 may determine that second image 460 of player 150 does not substantially match outline 220 of player 150 even if second image 460 is enclosed in outline 220. Thus, gesture-based game system 100 may not resume the playing of the gesture-based game.

Figure 4D:
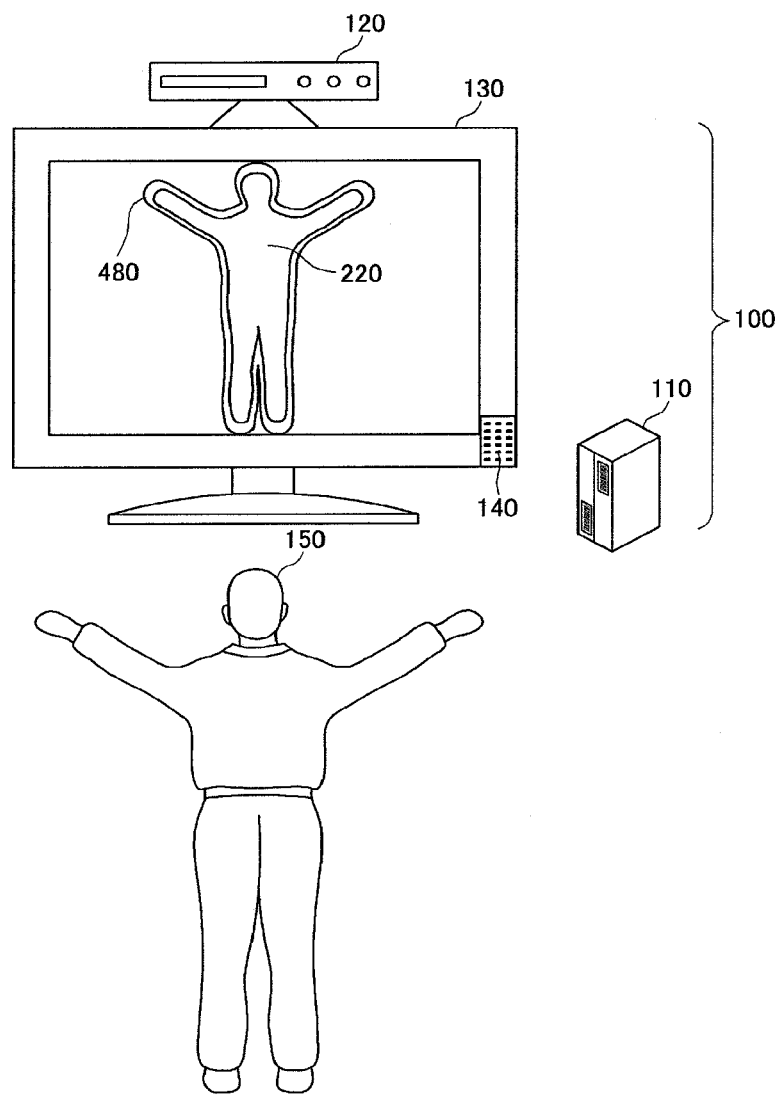

As depicted in FIG. 4D, if a distance between player 150 and camera 120 at the time of capturing a second image 480 is smaller than a predetermined distance such as, for example, the distance between player 150 and camera 120 at the time of the pause command, second image 480 may enclose outline 220. In such cases, gesture-based game system 100 may determine that second image 480 of player 150 does not substantially match outline 220 of player 150. Thus, gesture-based game system 100 may not resume the playing of the gesture-based game.

In some embodiments, gesture-based game system 100 may determine whether a skeleton image corresponding to the second image of player 150 substantially matches the skeleton image of outline 220 by calculating a similarity between the skeleton image corresponding to the second image of player 150 and the skeleton image of outline 220. By way of examples, but not limitation, gesture-based game system 100 may calculate the similarity by comparing x-y coordinates of the skeleton image corresponding to the second image of player 150 and x-y coordinates of the skeleton image of outline 220. Gesture-based game system 100 may determine whether the calculated similarity is over a certain threshold value.

By way of examples, but not limitation, if the calculated similarity is over, e.g., 80%, gesture-based game system 100 may determine that the skeleton image corresponding to the second image of player 150 substantially matches the skeleton image of outline 220. If the skeleton image corresponding to the second image of player 150 substantially matches the skeleton image of outline 220, gesture-based game system 100 may resume the playing of the gesture-based game. On the contrary, if the skeleton image corresponding to the second image of player 150 does not substantially matches the skeleton image of outline 220, gesture-based game system 100 may not resume the playing of the gesture-based game.

Figure 5A:
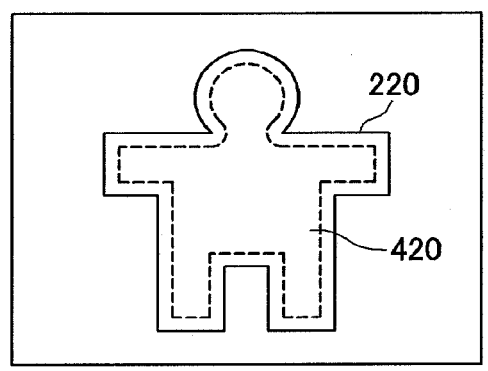
FIGS. 5A to 5D schematically show example methods in which a gesture-based game system determines whether a second image of a player matches an outline of the player.

FIGS. 5A to 5D schematically show example methods in which a gesture-based game system determines whether a second image of a player matches an outline of the player. The method in FIGS. 5A to 5D can be implemented in a gesture-based game system illustrated in FIGS. 1-4. As depicted in FIG. 5A, gesture-based game system 100 may first determine whether second image 420 is entirely enclosed in outline 220, and based thereon, may determine an appropriate process for determining whether the second image matches the outline. Specifically, gesture-based game system 100 may calculate x-y coordinates of second image 420 and outline 220 in a display area such as, for example, on display 130. Gesture-based game system 100 may calculate positions of pixels included in second image 420 and outline 220 based, at least in part, on the calculated x-y coordinates. Gesture-based game system 100 may determine whether second image 420 is entirely enclosed in outline 220 by comparing the positions of the pixels included in second image 420 with the positions of the pixels included in outline 220.

If second image 420 is entirely enclosed in outline 220, gesture-based game system 100 may calculate the ratio of the area of second image 420 to the area of outline 220. If the ratio of the area of second image 420 to the area of outline 220 is over a certain, predetermined ratio threshold, gesture-based game system 100 may determine that second image 420 substantially matches outline 220. By way of example, but not limitation, the ratio of the area of second image 420 to the area of outline 220 is over, e.g., 80%, desirably, e.g., 90%, gesture-based game system 100 may determine that second image 420 substantially matches outline 220, and therefore the gesture-based game may resume on gesture-based game system 100.

Figure 5B:
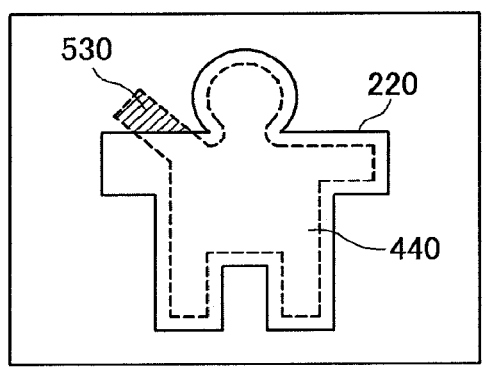

As depicted in FIG. 5B, if second image 440 is not entirely enclosed in outline 220, gesture-based game system 100 may calculate an area of a part 530 of second image 440 out of outline 220. In such cases, gesture-based game system 100 may calculate the ratio of the area of second image 440 enclosed in outline 220 to the area of outline 220. Further, gesture-based game system 100 may calculate a ratio of the area of part 530 to the area of outline 220. Then, gesture-based game system 100 may deduct the ratio of the area of part 530 to the area of outline 220 from the ratio of the area of second image 440 enclosed in outline 220 to the area of outline 220. By way of example, but not limitation, if a difference between the ratio of the area of part 530 to the area of outline 220 and the ratio of the area of second image 440 enclosed in outline 220 to the area of outline 220 is over, e.g., 80%, desirably, e.g., 90%, gesture-based game system 100 may determine that second image 440 substantially matches outline 220, and therefore the gesture-based game may resume on gesture-based game system 100.

Figure 5C:
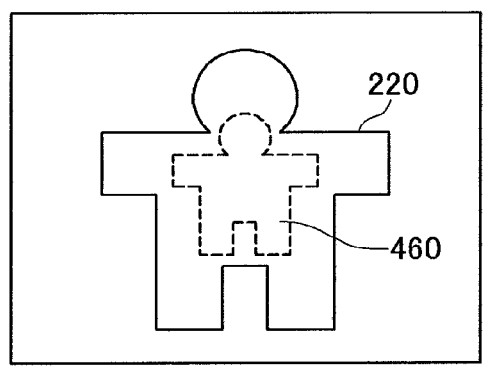

As depicted in FIG. 5C, even if second image 460 is entirely enclosed in outline 220, if the ratio of the area of second image 460 to the area of outline 220 is under a certain threshold, gesture-based game system 100 may determine that second image 460 does not substantially match outline 220. By way of example, but not limitation, if another player, e.g., a child, who is smaller than a player at the time of generating outline 220, is in a gesture-recognition range of camera 120 of gesture-based game system 100, second image 460 may be substantially smaller than outline 220. That is, second image 460 may be entirely enclosed in outline 220, but the ratio of the area of second image 460 to the area of outline 220 may be under a certain threshold. In such cases, gesture-based game system 100 may determine that second image 460 does not substantially match outline 220, and therefore the gesture-based game on gesture-based game system 100 would not resume.

Further, if a distance between player 150 and camera 120 at the time of capturing second image 460 is greater than a distance between player 150 and camera 120 at the time of generating outline 220, second image 460 may be substantially smaller than outline 220. In such cases, second image 460 may be entirely enclosed in outline 220, but the ratio of the area of second image 460 to the area of outline 220 may be under a certain threshold, and gesture-based game system 100 may determine that second image 460 does not substantially match outline 220. Even in the cases above illustrated with reference to FIG. 5C, if the ratio of the area of second image 460 to the area of outline 220 may be over the certain threshold, gesture-based game system 100, may determine that second image 460 substantially matches outline 220, and therefore the gesture-based game may resume on gesture-based game system 100.

Figure 5D:
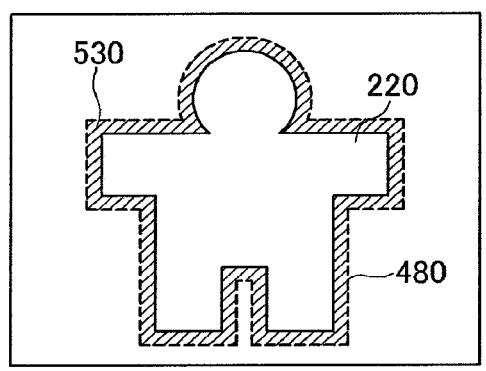

As depicted in FIG. 5D, if second image 480 is bigger than outline 220 and outline 220 is entirely enclosed in second image 480, gesture-based game system 100 may calculate an area of part 530 of second image 480 out of outline 220. Further, gesture-based game system 100 may calculate a ratio of the area of part 530 to the area of outline 220. Since outline 220 is entirely enclosed in second image 480, gesture-based game system 100 may deduct the ratio of the area of part 530 to the area of outline 220 from 100%. By way of example, but not limitation, if a difference between the ratio of the area of part 530 to the area of outline 220 and 100% is above, e.g., 80%, desirably, e.g., 90%, gesture-based game system 100 may determine that second image 480 substantially matches outline 220. On the contrary, if the difference between the ratio of the area of part 530 to the area of outline 220 and 100% is under a certain threshold, gesture-based game system 100 may determine that second image 480 does not substantially match outline 220, and therefore the gesture-based game on gesture-based game system 100 would not resume.

By way of example, but not limitation, if another player bigger than a player at the time of generating outline 220 is in a gesture-recognition range of camera 120 of gesture-based game system 100, second image 480 may enclose outline 220. In such cases, part 530 of second image 480 may be out of outline 220. If outline 220 is entirely enclosed in second image 480 but the ratio of the area of part 530 to the area of outline 220 is over a certain threshold, a difference between the ratio of the area of part 530 to the area of outline 220 and 100% may be under a certain threshold. In such cases, gesture-based game system 100 may determine that second image 480 does not substantially match outline 220, and therefore the gesture-based game on gesture-based game system 100 would not resume.

Further, if a distance between player 150 and camera 120 at the time of capturing second image 480 is smaller than a predetermined distance such as, for example, the distance between player 150 and camera 120 at the time of the pause command, second image 480 may enclose outline 220. In such cases, part 530 of second image 480 may be out of outline 220. If outline 220 is entirely enclosed in second image 480 but a ratio of an area of part 530 to an area of outline 220 is over a certain threshold, a difference between the ratio of the area of part 530 to the area of outline 220 and 100% may be under a certain threshold. Thus, the gesture-based game system may determine that second image 480 does not substantially match outline 220, and therefore the gesture-based game on gesture-based game system 100 would not resume.

The method in which gesture-based game system 100 determines whether the second image matches the outline based, at least in part, on the areas of the second image and the outline has been explained, but the claimed subject matter is not limited in this respect.

Figure 6:
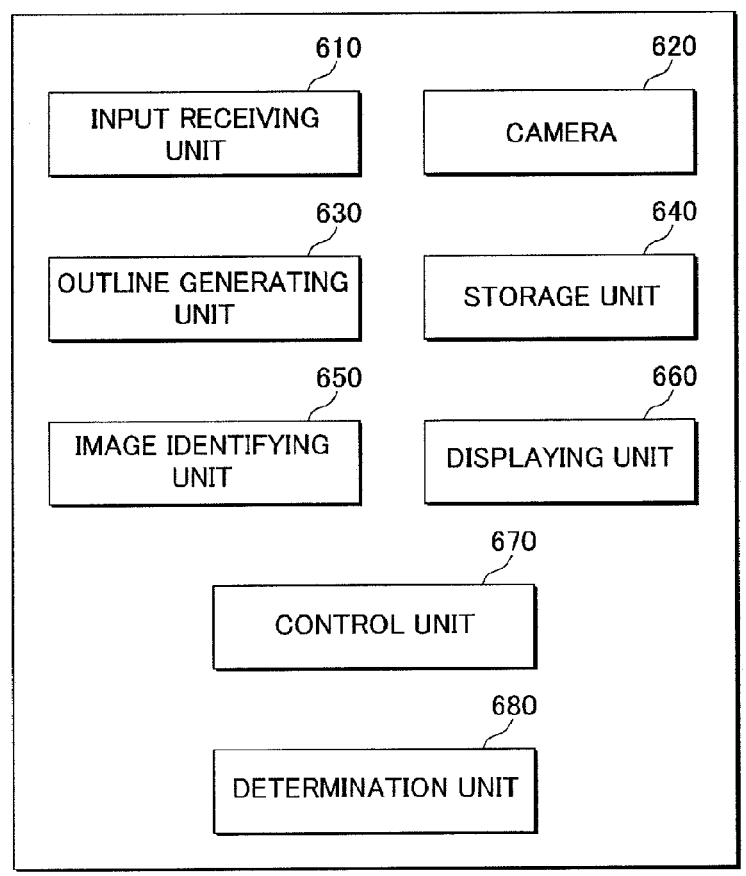
FIG. 6 shows a schematic block diagram illustrating an example architecture for a gesture-based game apparatus.

FIG. 6 shows a schematic block diagram illustrating an example architecture for a gesture-based game apparatus in accordance with at least some embodiments described herein. As depicted in FIG. 6, gesture-based game system 100 may include an input receiving unit 610, a camera 620, an outline generating unit 630, a storage unit 640, an image identifying unit 650, a displaying unit 660, a control unit 670 and a determination unit 680. Although illustrated as discrete components, various components may be divided into additional components, combined into fewer components, or eliminated altogether while being contemplated within the scope of the disclosed subject matter.

Input receiving unit 610 may be configured to receive a pause command to pause play of a gesture-based game. Input receiving unit 610 may transfer the pause command to camera 620 and control unit 670 as an electrical signal. The pause command may include a predetermined gesture of a player (e.g., player 150) of the gesture-based game or a predetermined word of the player.

Camera 620 may be configured to capture and store to storage unit 640 a first image of the player currently playing the gesture-based game in response to the receipt of the pause command from input receiving unit 610. The first image may be associated with a first posture of the player substantially at the time of the pause command.

Outline generating unit 630 may be configured to generate an outline of the player corresponding to the first image of the player. Outline generating unit 630 may calculate x-y coordinates of the outline of the player and store the x-y coordinates in storage unit 640. Further, outline generating unit 630 may calculate a first distance between the player and camera 620 of gesture-based game system 100 and store to storage unit 640 the first distance in storage unit 640 when generating the outline.

Storage unit 640 may be configured to store information or data necessary for running or executing the gesture-based game on gesture-based game system 100. By way of example, but not limitation, storage unit 640 may store at least one of the x-y coordinates of the outline of the player and the first distance between the player and camera 620.

Image identifying unit 650 may be configured to identify an avatar image associated with the first image of the player of the gesture-based game. Outline generating unit 630 may generate the outline of the player based, at least in part, on the first image of the player. In cases where displaying unit 660 displays the avatar image associated with the first image of the player, outline generating unit 630 may generate the outline of the player by taking the outline of the avatar image.

Displaying unit 660 may be configured to display images necessary for the gesture-based game run or executed by gesture-based game system 100. In some embodiments, displaying unit 660 may display the generated outline of the player or outline of the avatar image.

Control unit 670 may be configured to pause and/or resume the playing of the gesture-based game by, for example, respective commands provided to the system in the form of gestures captured by camera or voice commands recognized by a speech recognition module of control unit 670. In some embodiments, control unit 670 may pause the playing of the gesture-based game in response to the receipt of the pause command from input receiving unit 610.

As described above, when input receiving unit 610 receives the pause command, control unit 670 may pause the playing of the gesture-based game. At the same time, camera 620 may capture the first image of the player in response to the receipt of the pause command and outline generating unit 630 may generate the outline of the player corresponding to the first image.

After the playing of the gesture-based game is paused, when the player returns to a recognition range of camera 620 of gesture-based game system 100, camera 620 may capture a second image of the player. The second image may be associated with a second posture of the player at any time after the gesture-based game is paused.

Determination unit 680 may determine whether the second image of the player substantially matches the outline of the player corresponding to the first image. Determination unit 680 may retrieve the x-y coordinates of the outline from storage unit 640 for determining whether the second image of the player substantially matches the outline of the player. Determination unit 680 may compare x-y coordinates of the second image with the x-y coordinates of the outline. As a result of the comparison, if a difference between the second image and the outline is under a certain threshold, determination unit 680 may determine that the second image substantially matches the outline.

Further, when determination unit 680 may determine whether the second image of the player substantially matches the outline of the player corresponding to the first image, determination unit 680 may compare the first distance between the player and camera 620 at the time of capturing the first image and a second distance between the player and camera 620 at the time of capturing the second image.

When determination unit 680 determines that the second image substantially matches the outline, control unit 670 may resume the playing of the gesture-based game.

Figure 7:
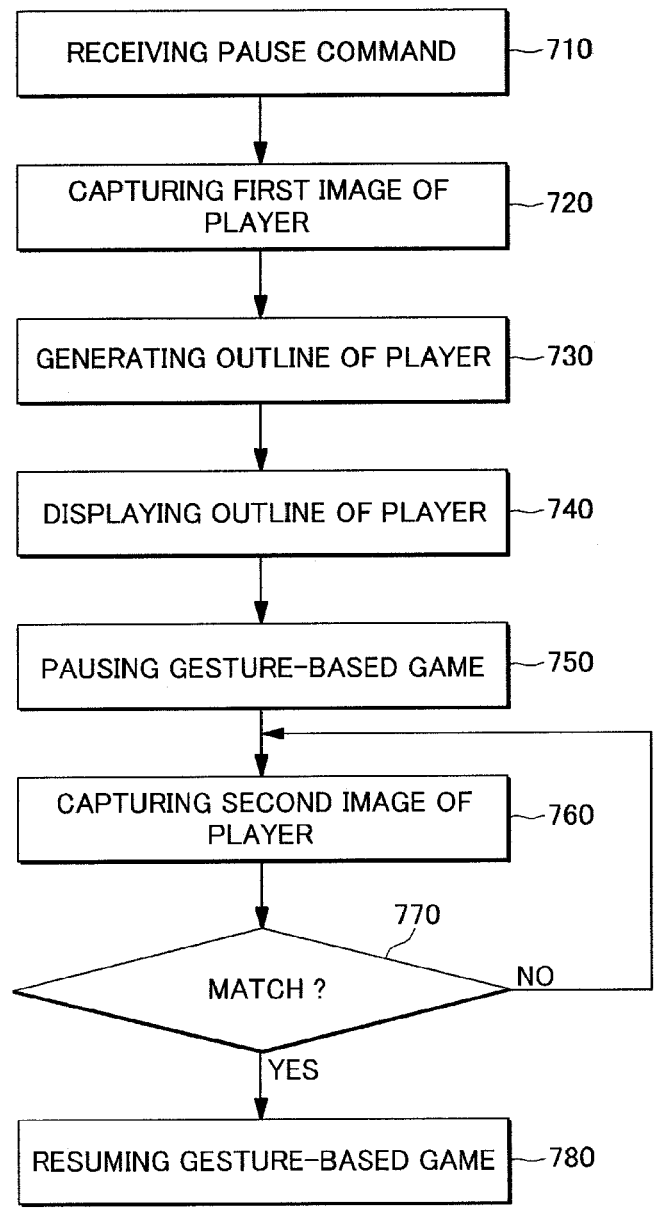
FIG. 7 shows an example flow diagram of a process for pausing and resuming playing of a gesture-based game.

FIG. 7 shows an example flow diagram of a process for pausing and resuming playing of a gesture-based game in accordance with at least some embodiments described herein. The method in FIG. 7 can be implemented in gesture-based game system 100 including input receiving unit 610, camera 620, outline generating unit 630, storage unit 640, image identifying unit 650, displaying unit 660, control unit 670 and determination unit 680 discussed above. An example process may include one or more operations, actions, or functions as illustrated by one or more blocks 710, 720, 730, 740, 750, 760, 770 and 780. Although illustrated as discrete blocks, various blocks may be divided into additional blocks, combined into fewer blocks, or eliminated, depending on the desired implementation. Processing may begin at block 710.

At block 710, gesture-based game system 100 may receive a pause command (which may be a voice command or a gesture command) to pause play of a gesture-based game. By way of example, when a player keeps his/her specific gesture for a certain period of time, e.g., for about 2 seconds, gesture-based game system 100 may determine the specific gesture as a pause command. Further, if the player says, for example, but not limitation, "hold", gesture-based game system 100 may detect such of the word spoken by the player through a microphone and determine the speech to be the pause command. Processing may continue from block 710 to block 720.

At block 720, gesture-based game system 100 may capture a first image of the player currently playing the gesture-based game in response to the receipt of the pause command at block 710. The first image may be associated with a first posture of the player and the first posture may be taken substantially at the time of the pause command received at block 710. Processing may continue from block 720 to block 730.

At block 730, gesture-based game system 100 may generate an outline of the player corresponding to the first image captured at block 720. In some embodiments, gesture-based game system 100 may calculate x-y coordinates of the outline of the player and a first distance between the player and camera 620 of gesture-based game system 100. Processing may continue from block 730 to block 740.

At block 740, gesture-based game system 100 may display the generated outline of the player on displaying unit 660 of gesture-based game system 100. Processing may continue from block 740 to block 750.

At block 750, gesture-based game system 100 may pause the play of the gesture-based game in response to the receipt of the pause command. Processing may continue from block 750 to block 760.

At block 760, gesture-based game system 100 may capture a second image of the player. The second image may be associated with a second posture of the player, and the second posture may be taken at any time after the gesture-based game is paused. Processing may continue from block 760 to block 770.

At block 770, gesture-based game system 100 may determine whether the second image of the player substantially matches the outline of the player corresponding to the first image. In some embodiments, gesture-based game system 100 may compare x-y coordinates of the second image with the x-y coordinates of the outline calculated at block 730. Further, gesture-based game system 100 may calculate a second distance between the player and camera 620 of gesture-based game system 100 and compare the second distance with the first distance calculated at block 730.

As a result of the determination at block 770, if it is determined that the second image of the player substantially matches the outline, gesture-based game system 100 may resume the playing of the gesture-based game, at block 780.

As a result of the determination at block 770, if it is determined that the second image of the player does not substantially match the outline, the play of the gesture-based game is not resumed.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 8:
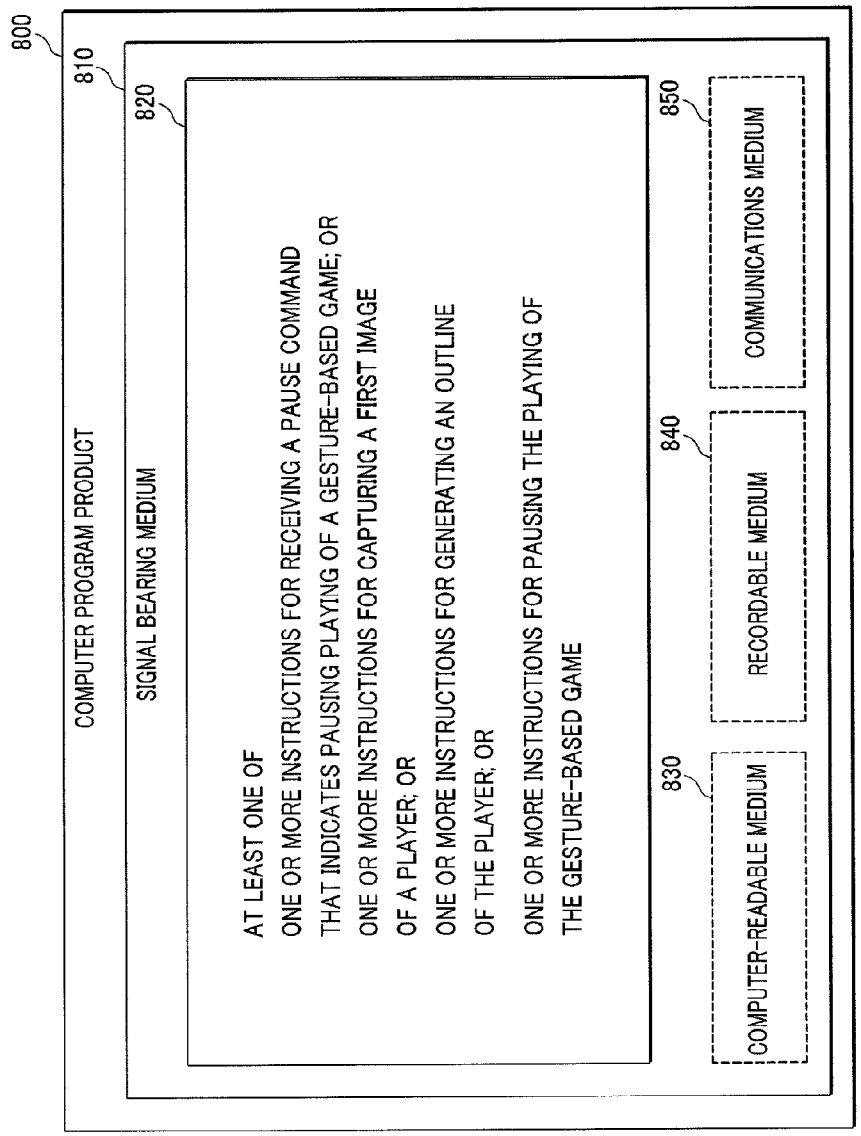
FIG. 8 illustrates computer program products that can be utilized to provide a pausing-resuming scheme for a gesture-based game system.

FIG. 8 illustrates computer program products 800 that can be utilized to provide a pausing-resuming scheme for a gesture-based game system in accordance with at least some embodiments described herein. Program product 800 may include a signal bearing medium 810. Signal bearing medium 810 may include one or more instructions 820 that, when executed by, for example, a processor, may provide the functionality described above with respect to FIGS. 1-7. By way of example, instructions 820 may include: one or more instructions for receiving a pause command that indicates pausing play of a gesture-based game; one or more instructions for capturing a first image of a player currently playing the gesture-based game, the first image being associated with a first posture of the player substantially at the time of the pause command in response to the receipt of the pause command; one or more instructions for generating an outline of the player corresponding to the first image of the player; one or more instructions for pausing the play of the gesture-based game. Thus, for example, referring to FIG. 6, gesture-based game system 100 may undertake one or more of the blocks shown in FIG. 7 in response to instructions 820.

Further, by way of example, instructions 820 may include: one or more instructions for identifying an avatar image associated with the first image of the player. Furthermore, by way of example, instructions 820 may include: one or more instructions for capturing a second image of the player, the second image being associated with a second posture of the player at a time subsequent to the time of the pause command; one or more instructions for determining whether the second image of the player substantially matches the outline of the player corresponding to the first image; one or more instructions for resuming the playing of the gesture-based game upon determining that the second image substantially matches the outline of the player corresponding to the first image.

In some implementations, signal bearing medium 810 may encompass a computer-readable medium 830, such as, but not limited to, a hard disk drive, a CD, a DVD, a digital tape, memory, etc. In some implementations, signal bearing medium 810 may encompass a recordable medium 840, such as, but not limited to, memory, read/write (R/W) CDs, R/W DVDs, etc. In some implementations, signal bearing medium 810 may encompass a communications medium 850, such as, but not limited to, a digital and/or an analog communication medium (e.g., a fiber optic cable, a waveguide, a wired communications link, a wireless communication link, etc.). Thus, for example, program product 800 may be conveyed to one or more modules of gesture-based game system 100 by an RF signal bearing medium 810 where the signal bearing medium 810 is conveyed by a wireless communications medium 850 (e.g., a wireless communications medium conforming with the IEEE 802.11 standard). In some implementations, program product 800 may be executed on a cloud game server or a component of a cloud game system, both of which may be communicatively coupled to gesture-based game system 100.

Figure 9:
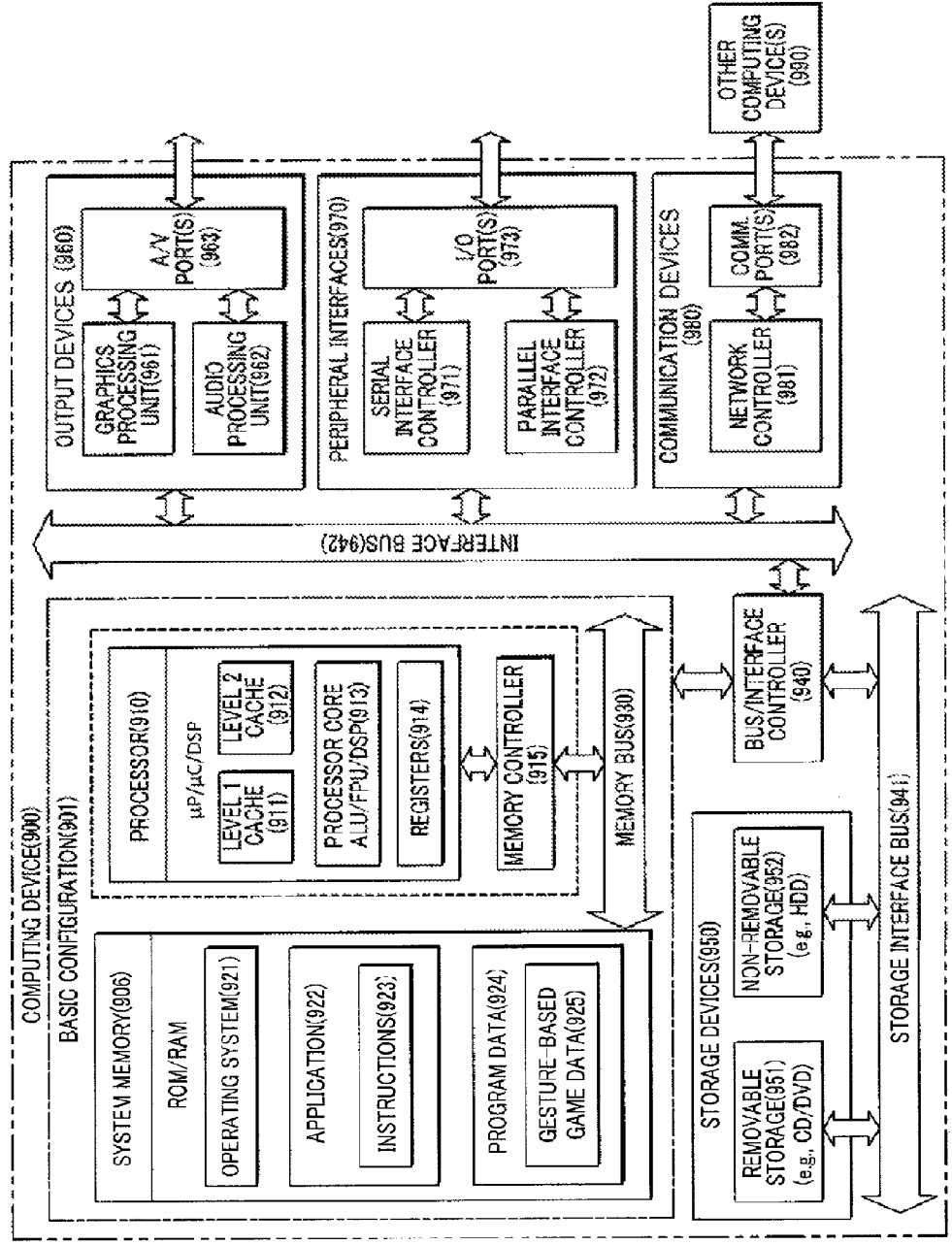
FIG. 9 is a block diagram illustrating an example computing device that can be utilized to provide a pausing-resuming scheme for a gesture-based game system; all arranged in accordance with at least some embodiments described herein.

FIG. 9 is a block diagram illustrating an example computing device 900 that can be utilized to provide a pausing-resuming scheme for a gesture-based game system in accordance with at least some embodiments described herein. In these examples, elements of computing device 900 may be arranged or configured for a gesture-based game system. In a very basic configuration 901, computing device 900 typically includes one or more processors 910 and a system memory 906. A memory bus 930 may be used for communicating between processor 910 and system memory 906.

Depending on the desired configuration, processor 910 may be of any type including but not limited to a microprocessor (μP), a microcontroller (μC), a digital signal processor (DSP), or any combination thereof. Processor 910 may include one more levels of caching, such as a level one cache 911 and a level two cache 912, a processor core 913, and registers 914. An example processor core 913 may include an arithmetic logic unit (ALU), a floating point unit (FPU), a digital signal processing core (DSP Core), or any combination thereof. An example memory controller 915 may also be used with processor 910, or in some implementations memory controller 915 may be an internal part of processor 910.

Depending on the desired configuration, system memory 906 may be of any type including but not limited to volatile memory (such as RAM), non-volatile memory (such as ROM, flash memory, etc.) or any combination thereof. System memory 906 may include an operating system 921, one or more applications 922, and program data 924. Application 922 may include instructions 923 that may be arranged to perform the functions as described herein including the actions described with respect to the gesture-based game system 100 architecture as shown in FIG. 6 or including the actions described with respect to the flow charts shown in FIG. 7. Program data 924 may include gesture-based game data 925 that may be utilized for implementing instructions 923. In some examples, application 922 may be arranged to operate with program data 924 on an operating system 921 such that implementations for instructions for a gesture-based game system as described herein.

Computing device 900 may have additional features or functionality, and additional interfaces to facilitate communications between basic configuration 901 and any required devices and interfaces. For example, a bus/interface controller 940 may be used to facilitate communications between basic configuration 901 and one or more data storage devices 950 via a storage interface bus 941. Data storage devices 950 may be removable storage devices 951, non-removable storage devices 952, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 906, removable storage devices 951 and non-removable storage devices 952 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 900. Any such computer storage media may be part of computing device 900.

Computing device 900 may also include an interface bus 942 for facilitating communication from various interface devices (e.g., output devices 960, peripheral interfaces 970, and communication devices 980) to basic configuration 901 via bus/interface controller 940. Example output devices 960 include a graphics processing unit 961 and an audio processing unit 962, which may be configured to communicate to various external devices such as a display or speakers via one or more A/V ports 963. Example peripheral interfaces 970 include a serial interface controller 971 or a parallel interface controller 972, which may be configured to communicate with external devices such as input devices (e.g., keyboard, mouse, pen, voice input device, touch input device, etc.) or other peripheral devices (e.g., printer, scanner, etc.) via one or more I/O ports 973. An example communication device 980 includes a network controller 981, which may be arranged to facilitate communications with one or more other computing devices 990 over a network communication link via one or more communication ports 982.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 900 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 900 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A method performed under control of a processor for a gesture-based game system, comprising:
   receiving, by the processor, a pause command to pause play of a gesture-based game;
   capturing, by the processor, a first image of a player using a camera, the first image including the player in a first posture at a substantially same time as the receiving of the pause command;
   generating, by the processor, an outline of the player corresponding to the first image of the player,
   wherein the generating the outline of the player includes calculating, by the processor:
      x-y coordinates of the outline of the player, and
      positions of pixels included in the outline based, at least in part, on the calculated x-y coordinates of the outline of the player;
   pausing, by the processor, the play of the gesture-based game;
   capturing, by the processor, a second image of the player using the camera, the second image including the player in a second posture after the receiving of the pause command;
   determining, by the processor, whether the second image of the player substantially matches the outline of the player corresponding to the first image,
   wherein the determining includes:
      comparing, by the processor, the second image of the player with the positions of pixels of the outline of the player, and
      determining, by the processor, whether the second image of the player is entirely enclosed in the outline of the player based, at least in part, on the comparison of the second image of the player with the positions of pixels of the outline of the player; and
   resuming, by the processor, the play of the gesture-based game upon determining that the second image substantially matches the outline of the player corresponding to the first image.

2. The method of claim 1, wherein, if the second image is entirely enclosed in the outline, the determining whether the second image of the player substantially matches the outline of the player corresponding to the first image further includes:
   calculating, by the processor, a ratio of an area of the second image to an area of the outline; and determining, by the processor, whether the ratio of the area of the second image to the area of the outline is greater than a predetermined ratio threshold.

3. The method of claim 1, wherein, if the second image is not entirely enclosed in the outline, the determining whether the second image of the player substantially matches the outline of the player corresponding to the first image further includes:
calculating, by the processor, an area of a part of the second image out of the outline, a ratio of an area of the second image enclosed in the outline to an area of the outline, and a ratio of the area of the part of the second image out of the outline to the area of the outline;
deducting, by the processor, the ratio of the area of the part of the second image out of the outline to the area of the outline from the ratio of the area of the second image enclosed in the outline to the area of the outline; and
determining, by the processor, whether a difference between the ratio of the area of part of the second image out of the outline to the area of outline and the ratio of the area of the second image enclosed in the outline to the area of the outline is greater than a predetermined ratio threshold.

4. The method of claim 1, further comprising:
displaying, by the processor, on a screen coupled to the gesture-based game system, the generated outline of the player.

5. The method of claim 1, further comprising:
identifying, by the processor, an avatar image associated with the first image of the player, and
wherein the generating the outline of the player is based, at least in part, on the avatar image.

6. The method of claim 1, wherein the generating the outline of the player further includes calculating, by the processor, a distance between the player and the gesture-based game system, and
wherein the determining further includes comparing, by the processor, the distance between the player and the gesture-based game system associated with the first image of the player and a distance between the player and the gesture-based game system associated with the second image of the player.

7. The method of claim 1, wherein the pause command includes a speech of the player.

8. The method of claim 1, wherein the pause command includes a gesture of the player.

9. A gesture-based game apparatus, comprising:
an input receiving unit configured to receive a pause command to pause play of a gesture-based game;
a camera configured to capture a first image of a player that includes the player in a first posture at a substantially same time as the receiving of the pause command;
an outline generating unit configured to generate an outline of the player corresponding to the first image of the player,
wherein the outline generating unit is configured to calculate x-y coordinates of the outline of the player and positions of pixels included in the outline based, at least in part, on the calculated x-y coordinates of the outline of the player;
a control unit configured to pause the play of the gesture-based game in response to the receipt of the pause command,
wherein the camera is further configured to capture a second image of the player that includes the player in a second posture after the receiving of the pause command, a determination unit configured to determine whether the second image of the player substantially matches the outline of the player corresponding to the first image,
wherein the determination unit is configured to:
compare the second image of the player with the positions of pixels of the outline of the player, and
determine whether the second image of the player is entirely enclosed in the outline of the player based, at least in part, on the comparison of the second image of the player with the positions of the pixels of the outline of the player, and
wherein the control unit is further configured to resume the play of the gesture-based game upon determining that the second image substantially matches the outline of the player corresponding to the first image.

10. The apparatus of claim 9, if the second image is entirely enclosed in the outline, wherein the determination unit is further configured to:
calculate a ratio of an area of the second image to an area of the outline; and
determine whether the ratio of the area of the second image to the area of the outline is greater than a predetermined ratio threshold.

11. The apparatus of claim 9, if the second image is not entirely enclosed in the outline, wherein the determination unit is further configured to:
calculate an area of a part of the second image out of the outline, a ratio of an area of the second image enclosed in the outline to an area of the outline, and a ratio of the area of the part of the second image out of the outline to the area of the outline;
deduct the ratio of the area of the part of the second image out of the outline to the area of the outline from the ratio of the area of the second image enclosed in the outline to the area of the outline; and
determine whether a difference between the ratio of the area of part of the second image out of the outline to the area of outline and the ratio of the area of the second image enclosed in the outline to the area of the outline is greater than a predetermined ratio threshold.

12. The apparatus of claim 9, further comprising:
a displaying unit configured to display the generated outline of the player.

13. The apparatus of claim 9, wherein the outline generating unit is further configured to calculate a distance between the player and the gesture-based game apparatus, and
wherein the determination unit is further configured to compare the distance between the player and the gesture-based game apparatus with the first image of the player and a distance between the player and the gesture-based game apparatus associated with the second image of the player.

14. The apparatus of claim 9, further comprising:
an image identifying unit configured to identify an avatar image associated with the first image of the player, and
wherein the outline generating unit generates the outline of the player based, at least in part, on the avatar image.

15. The apparatus of claim 9, wherein the pause command includes a speech of the player.

16. The apparatus of claim 9, wherein the pause command includes a gesture of the player.

17. A non-transitory computer-readable storage medium having stored thereon computer-executable instructions that, in response to execution, cause a gesture-based game apparatus to perform operations, comprising:
receiving a pause command to pause play of a gesture-based game;

capturing a first image of a player using a camera, the first image including the player in a first posture at a substantially same time as the receiving of the pause command;

generating an outline of the player corresponding to the first image of the player;

wherein the generating the outline of the player includes calculating x-y coordinates of the outline of the player, and positions of pixels included in the outline based, at least in part, on the calculated x-y coordinates of the outline of the player pausing the play of the gesture-based game;

capturing a second image of the player using the camera, the second image including the player in a second posture after the receiving of the pause command;

determining whether the second image of the player substantially matches the outline of the player corresponding to the first image, wherein the determining includes:

comparing the second image of the player with the positions of pixels of the outline of the player, and determining whether the second image of the player is entirely enclosed in the outline of the player based, at least in part, on the comparison of the second image of the player with the positions of the pixels of the outline of the player; and resuming the play of the gesture-based game upon determining that the second image substantially matches the outline of the player corresponding to the first image.

18. The non-transitory computer-readable storage medium of claim 17, if the second image is entirely enclosed in the outline, wherein the determining whether the second image of the player substantially matches the outline of the player corresponding to the first image further includes:

calculating a ratio of an area of the second image to an area of the outline; and determining whether the ratio of the area of the second image to the area of the outline is greater than a predetermined ratio threshold.

19. The non-transitory computer-readable storage medium of claim 17, if the second image is not entirely enclosed in the outline, wherein the determining whether the second image of the player substantially matches the outline of the player corresponding to the first image further includes:

calculating an area of a part of the second image out of the outline, a ratio of an area of the second image enclosed in the outline to an area of the outline, and a ratio of the area of the part of the second image out of the outline to the area of the outline;

deducting the ratio of the area of the part of the second image out of the outline to the area of the outline from the ratio of the area of the second image enclosed in the outline to the area of the outline; and determining whether a difference between the ratio of the area of part of the second image out of the outline to the area of outline and the ratio of the area of the second image enclosed in the outline to the area of the outline is greater than a predetermined ratio threshold.

20. The non-transitory computer-readable storage medium of claim 17, the operations further comprising:

identifying an avatar image associated with the first image of the player, and wherein the generating the outline of the player is based, at least in part, on the avatar image.

\* \* \* \* \*